US010645608B2

(12) United States Patent
Shaw et al.

(10) Patent No.: US 10,645,608 B2
(45) Date of Patent: May 5, 2020

(54) SYSTEMS AND METHODS FOR ON DEMAND INTELLIGENT ANALYTICS DYNAMIC ACCESS NETWORK SLICE SWITCHING AND CARRIER AGGREGATION

(71) Applicant: AT&T Intellectual Property I, L.P., Atlanta, GA (US)

(72) Inventors: Venson M. Shaw, Kirkland, WA (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/791,978

(22) Filed: Oct. 24, 2017

(65) Prior Publication Data
US 2019/0124544 A1    Apr. 25, 2019

(51) Int. Cl.
H04W 4/00        (2018.01)
H04W 28/02       (2009.01)
(Continued)

(52) U.S. Cl.
CPC ....... *H04W 28/0268* (2013.01); *H04W 28/24* (2013.01); *H04W 72/1242* (2013.01); *H04W 88/06* (2013.01)

(58) Field of Classification Search
CPC ................. H04J 2203/0069; H04W 72/04
See application file for complete search history.

(56) References Cited

U.S. PATENT DOCUMENTS 9,111,288 B2    8/2015  Paul et al.
2011/0149968 A1  6/2011  Kim
(Continued)

FOREIGN PATENT DOCUMENTS

CA    2871263 C    11/2016
EP    2592789 A1    5/2013
(Continued)

OTHER PUBLICATIONS

Hakiri et al.; "Leveraging SDN for The 5G Networks: Trends, Prospects and Challenges"; Network and Internet Architecture; Jun. 2015; 23 pages.
(Continued)

*Primary Examiner* — Shantell L Heiber
(74) *Attorney, Agent, or Firm* — BakerHostetler

(57) ABSTRACT

Systems and methods for dynamic access network slice switching and carrier aggregation include a radio access network (RAN) and user devices with dual radio user equipment. The RAN receives a 4G and a 5G service request from user equipment having a specified priority. A first RAN slice for the 4G and 5G service request is instantiated using a RAN scheduler. A temporary radio resource control protocol slice having an associated timer that allows the dual radio user equipment to stay connected to the RAN for a period of time is then instantiated. Instructions identifying an appropriate resource and RAN slice for complying with user plane service level agreement requirements are received at the RAN and a second RAN slice for instantiating a carrier aggregation slice comprising both the 4G and 5G radio resource control protocol request for complying with the user plane service level agreement requirement is engaged.

20 Claims, 3 Drawing Sheets

(51) Int. Cl.
*H04W 72/12* (2009.01)
*H04W 28/24* (2009.01)
*H04W 88/06* (2009.01)

(56) References Cited

U.S. PATENT DOCUMENTS

| | | |
|---|---|---|
| 2011/0276447 A1 | 11/2011 | Paul et al. |
| 2014/0169343 A1* | 6/2014 | Skov ............... H04L 5/0007 370/336 |
| 2016/0156513 A1 | 6/2016 | Zhang et al. |
| 2016/0352645 A1 | 12/2016 | Senarath et al. |
| 2016/0352734 A1 | 12/2016 | Senarath et al. |
| 2016/0353367 A1 | 12/2016 | Vrzic et al. |
| 2017/0054595 A1 | 2/2017 | Zhang et al. |
| 2017/0070892 A1 | 3/2017 | Song et al. |
| 2017/0079059 A1 | 3/2017 | Li et al. |
| 2017/0086118 A1 | 3/2017 | Vrzic |
| 2017/0141973 A1 | 5/2017 | Vrzic |
| 2017/0142591 A1 | 5/2017 | Vrzic |
| 2017/0164349 A1 | 6/2017 | Zhu et al. |
| 2017/0257870 A1 | 9/2017 | Farmanbar et al. |
| 2018/0020386 A1* | 1/2018 | Chandramouli .. H04W 36/0027 |

FOREIGN PATENT DOCUMENTS

| | | | |
|---|---|---|---|
| GB | 2546569 A | 7/2017 | |
| WO | WO-2016192640 A1 * | 12/2016 | ............. H04W 4/24 |
| WO | WO 2017/119844 A1 | 7/2017 | |
| WO | WO 2017/123127 A1 | 7/2017 | |
| WO | WO 2017/135856 A1 | 8/2017 | |
| WO | WO 2017/140340 A1 | 8/2017 | |
| WO | WO 2017/147271 A1 | 8/2017 | |
| WO | WO-2017140340 A1 * | 8/2017 | |
| WO | WO-2017200264 A1 * | 11/2017 | ............. H04W 76/12 |
| WO | WO-2017200978 A1 * | 11/2017 | ............. H04W 4/001 |
| WO | WO-2017218849 A1 * | 12/2017 | ............. H04W 76/10 |

OTHER PUBLICATIONS

Akyildiz et al.; "Wireless software-define networks (W-SDNs) and network function virtualization (NFV) for 5G cellular system: An overview and qualitative evaluation"; Computer Networks; vol. 93; 2015; p. 66-79.

Konstantinos et al.; "From Network Sharing to Multi-tenancy: The 5G Network Slice Broker"; IEEE Communications Magazine; vol. 54.7; 2016; 11 pages.

Peng et al.; "System Architecture and Key Technologies for 5G Heterogeneous Cloud Radio Access Networks"; IEEE Network Magazine; 2015; 20 pages.

Nikaein et al.; "Network Store: Exploring Slicing in Future 5G Networks"; ACM Proceedings of the 10$^{th}$ Int'l Workshop on Mobility in the Evolving Internet Architecture; 2015; p. 8-13.

* cited by examiner

SYSTEMS AND METHODS FOR ON DEMAND INTELLIGENT ANALYTICS DYNAMIC ACCESS NETWORK SLICE SWITCHING AND CARRIER AGGREGATION

TECHNICAL FIELD

The present disclosure pertains to the field of network communications, and in particular to a system and methods for implementing network slice switching and carrier aggregation.

BACKGROUND 4G is synonymous with Long Term Evolution (LTE) technology, which is an evolution of the existing 3G wireless standard. LTE is an advanced form of 3G that implements a shift from hybrid data and voice networks to a data-only IP network. There are two key technologies that enable LTE to achieve higher data throughput than predecessor 3G networks: multiple input, multiple output (MIMO) and Orthogonal frequency-division multiplexing (OFDM). OFDM is a transmission technique that uses a large number of closely-spaced carriers that are modulated with low data rates. It's a spectral efficiency scheme that enables high data rates and permits multiple users to share a common channel. The MIMO technique further improves data throughput and spectral efficiency by using multiple antennas at the transmitter and receiver. It uses complex digital signal processing to set up multiple data streams on the same channel. The early LTE networks support 2×2 MIMO (indicates two antennas at the transmit end and 2 antennas at the receive end) in both the downlink and uplink.

5G is the term used to describe the next-generation of mobile networks beyond the 4G LTE mobile networks of today. Most experts say 5G will feature network speeds of 20 G/bps or higher and have a latency of mere milliseconds. Not only will people be connected to each other but so will machines, automobiles, city infrastructure, public safety and more. 5G will likely be designed to build upon the existing LTE networks and many features will start to be available as part of the LTE-Advanced Pro standard. Some of those features include carrier aggregation, which lets operators use existing spectrum more effectively and also increases network capacity. Carrier aggregation will also allow wireless operators to increase user throughput rates. Software-defined networking (SDN) and network functions virtualization (NFV) are play a key role for operators as they migrate from 4G to 5G and scale their networks. SDN will be necessary for operators to carve virtual "sub-networks" or slices that can be then used for bigger bandwidth applications. That includes video, which might need throughput speeds of 10 Gb/s as well as lower bandwidth applications to connect devices that are less demanding on the network, such as smartwatches. 5G networks are also expected to have always-on capabilities and be energy efficient, all of which will likely require new protocols and access technologies.

Throughput, latency, reliability, availability are paramount importance with the increasing diversity of services carried by mobile networks. 5G systems are expected to be built in a way to enable logical network slices, which will allow telecom operators to provide networks on an as-a-service basis. Through the use of SDN and NFV, functional nodes can be created at various points in the network and access to the functional nodes can be restricted to sets of devices. Network slicing technology can provide connectivity for a variety user devices including smart meters requiring high availability and high reliability data-only service, with a given latency, data rate and security level and, at the same time, providing connectivity for applications requiring very high throughput, high data speeds and low latency such as an augmented reality service.

Slice handover/reselection is the process where a UE is served by a first slice, but then is moved to another slice to receive network services. A UE may move from a first slice to a second slice (a slice handover, or a slice reselection) for a number of reasons. For example, if a user is attached to a first slice, and moves to a location that is not served by resources in the slice there is a need to transfer the user to a different slice to continue supporting the UE. Service requirement changes may be another reason for a slice handover. For example, it may be desirable to switch from a network slice with low mobility support when the UE is in a congested areas to high mobility support when the UE may be travelling at high speed on a highway.

Due to the diversity of 5G application scenarios, new mobility management schemes are greatly needed to guarantee seamless handover in network slicing based 5G systems. There is a need to provide intelligent decision making in the allocation and switching of network slices. There is a need to provide scalable expansion of network resources according to subscriber traffic and service delivery. There is a need to provide on demand resource allocation in 5G networks using slice allocation. There is a need for a user equipment initiated method to dynamically allocate and switch network slices accessed by the user equipment. There is a need for instantiating carrier aggregation slices comprising both 4G RRC and 5G RRC to comply with user plane service level agreements. There is also a need to provide service assurance based on needs, device priority and service priority.

SUMMARY

One general aspect includes a method including: receiving at a radio access network a 4G service request and a 5G service request from a dual radio user equipment having a specified priority, instantiating a first radio access network slice for the 4G service request and the 5G service request using a radio access network scheduler, instantiating a temporary radio resource control protocol slice having an associated timer that allows the dual radio user equipment to stay connected to the radio access network for a period of time, forwarding a combined 4G and 5G radio resource control protocol request to a management gateway via a control plane, receiving instructions identifying an appropriate resource and an appropriate radio access network slice for complying with user plane service level agreement requirements, and engaging a second radio access network slice for instantiating a carrier aggregation slice including both the 4G and 5G radio resource control protocol request for complying with the user plane service level agreement requirement.

One general aspect includes a system including: a processor, a memory coupled to the processor and configured to store program instructions executable by the processor. The instructions include instructions to receive at a radio access network a 4G service request and a 5G service request from a dual radio user equipment having a specified priority. The instructions also include instructions to instantiate a first radio access network slice for the 4G service request and the 5G service request using a radio access network scheduler.

The instructions also include instructions to instantiate a temporary radio resource control protocol slice having an associated timer that allows the dual radio user equipment to stay connected to the radio access network for a period of time. The instructions also include instructions to forward a combined 4G and 5G radio resource control protocol request to a management gateway via a control plane. The instructions also include instructions to receive instructions identifying an appropriate resource and an appropriate radio access network slice for complying with user plane service level agreement requirements. The instructions also include instructions to engage a second radio access network slice for instantiating a carrier aggregation slice including both the 4G and 5G radio resource control protocol request for complying with a user plane service level agreement requirement.

One general aspect includes a non-transitory computer-readable storage medium, including program instructions, where the program instructions are computer-executable to: receive at a radio access network a 4G service request and a 5G service request from a dual radio user equipment having a specified priority; instantiate a first radio access network slice for the 4G service request and the 5G service request using a radio access network scheduler; instantiate a temporary radio resource control protocol slice having an associated timer that allows the dual radio user equipment to stay connected to the radio access network for a period of time; forward a combined 4G and 5G radio resource control protocol request to a management gateway via a control plane; receive instructions identifying an appropriate resource and an appropriate radio access network slice for complying with user plane service level agreement requirements; and engage a second radio access network slice for instantiating a carrier aggregation slice including both the 4G and 5G radio resource control protocol request for complying with a user plane service level agreement requirement.

DETAILED DESCRIPTION OF ILLUSTRATIVE EMBODIMENTS

Figure 1:
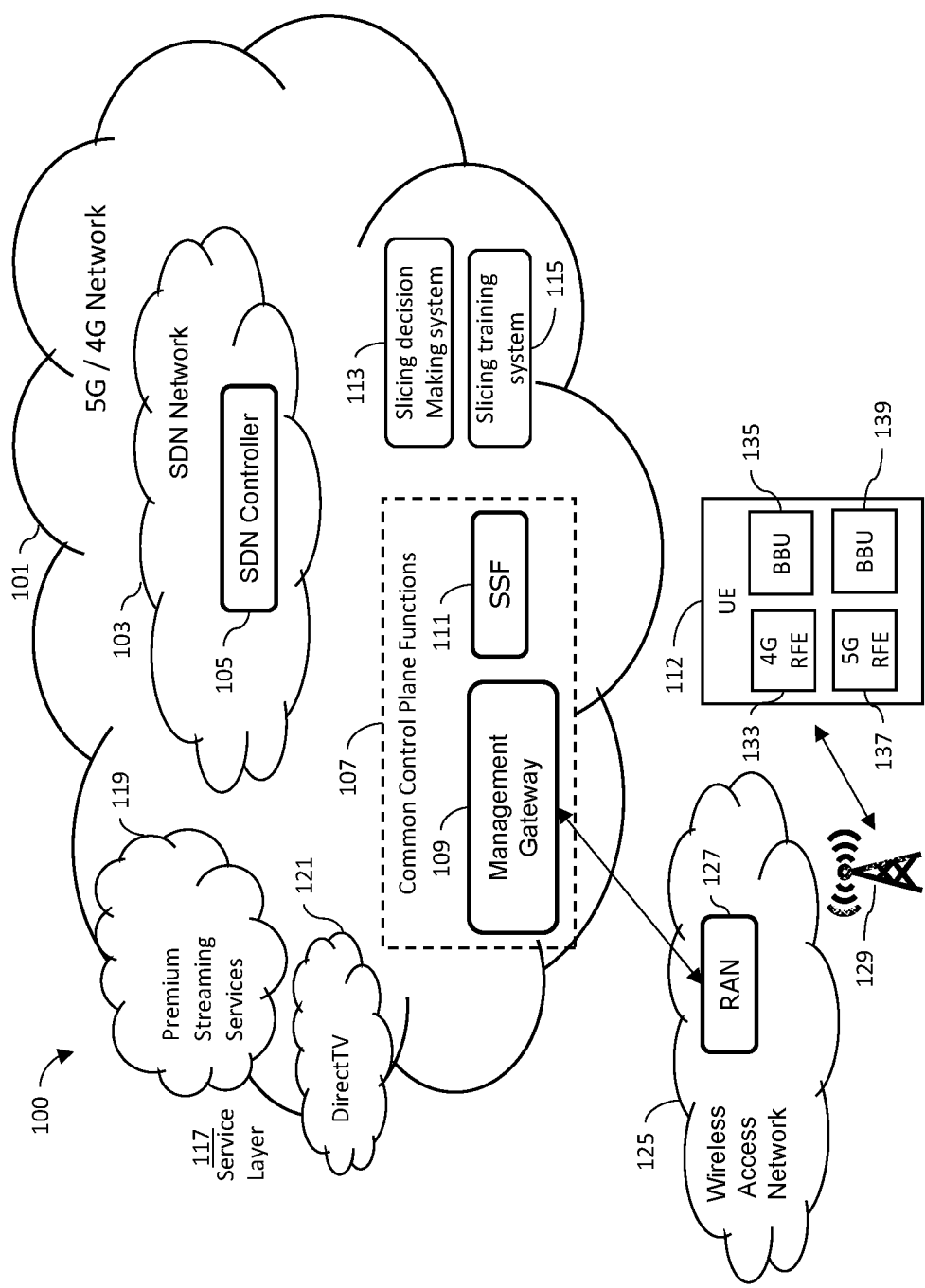
FIG. 1 is an illustration of a 5G device initiated dynamic access network slice switching system architecture.

Illustrated in FIG. 1 is an exemplary communication network 100 in which a 5G device initiated dynamic access network slice switching method may be implemented. A network 101 includes a software defined network (SDN), SDN network 103. The SDN network 103 can be controlled by one or more SDN controllers. For example, the SDN network 103 may include an SDN controller 105. The SDN controller 105 may be a computing system executing computer executable instructions and/or modules to provide various functions. In one or more embodiments, multiple computer systems or processors can provide the functionality illustrated and described herein with respect to the SDN controller 105. In one or more embodiments, the SDN controller 105 may include various components and/or can be provided via cooperation of various network devices or components. For example SDN controller 105 may include or have access to various network components or resources, such as a network resource controller, network resource autonomous controller, a service resource controller, a service control interpreter, adapters, application programming interfaces, compilers, and network data collection and/or analytics engine (not shown). SDN controller 105 may also include access information describing available resources and network information, such as network objects statistics, events or alarms, topology, and state changes. In one or more embodiments SDN controller 105 may use, generate or access system configurations, including configuration of resources available to the SDN controller 105 for providing access to services.

The network 101 may be provided with common control plane functions 107 that include a management gateway such as MGW 109 and a slice selection function (SSF) such as SSF 111. The MGW 109 can capture traffic entering the communication network 101 from various communication devices for example user equipment such as UE 112. MGW 109 can communicate with the SDN network 103 through SDN controller 105 regarding traffic entering the communication network 100. In one embodiment the MGW 109 and the SDN controller 105 can communicate via an OpenFlow protocol. The MGW 109 can inform the SDN controller 105 of information regarding services sought by one or more communication devices such as UE 112. SDN Controller 105 is an application in a software-defined network that manages flow control to enable intelligent networking. SDN controller 105 allow servers to tell switches where to send packets. SDN controller 105 can also analyze requested services to determine the service functions and or network data flows that would be required to facilitate delivery of the services to the user equipment such as UE 112.

SSF 111 is responsible for selecting the appropriate slice per user. SSF111 includes a network interface for receiving indications of triggering events and for transmitting instructions, a processor and a non-transient memory for storing instructions. The instructions, upon execution by the processor, cause the slice selection function to select a second slice as a target slice; and to initiate a migration of the mobile device to the selected target slice in response to a slice reselection triggering event associated with a UE112. In some embodiments a slice reselection triggering event occurs when there is a change in the service requirements of the mobile device. In some embodiments the instructions which cause the slice selection function to initiate a migration of the UE112 to the selected target slice may be responsive to a slicing decision making system 113.

The slicing decision making system 113 determines the appropriate slice based on certain criteria. The criteria may be related to the type of customer, the service area, needed coverage for special events, the user equipment and the services being requested. For example, the service delivery enforced by the slicing decision making system 113 may be based on the following criteria:

Most-Preferred customers
Most-Critically Needed customers (senior citizen),
Most-Critically Needed Service Area (earthquake, tsunami, tornado, hurricane)
Most-Critically Needed Event Coverage (Super Bowl, Olympics, World Cup,)
Highest Priority devices (e.g., iPhone 6)
Highest Priority Services (VoLTE launch, etc).

In one embodiment the network 101 may include a slicing training system 115. The slicing training system 115 provides 5G data analytics and training for service assurance.

In another embodiment the slicing decision making system 113 and the slicing training system 115 may be included in the UE 112.

In one embodiment, the SDN controller 105 may query a service layer 117 to determine what specific network functions are required to facilitate the requested service or services. For example in an embodiment the requested services may be a premium streaming service 119 (HBO GO, MAXGO, Showtime Anytime) or a DirecTV service 121.

The communication network 100 may include a wireless access network 125 having a radio access network such as RAN 127. RAN 127 implements the underlying physical connection method for a radio based communication network and connects to a core network (not shown). A mobility network 129 such as an LTE network or a 5G network can establish wireless communications with UE 112, where the UE 112 can move from cell to cell while maintaining a communication session. In one or more embodiments, the UE 112 can establish a session with a portal. The portal can be a function of an application that is resident at the UE 112 as a standalone application or as a client application to a server application of the network 100. The portal functionality enables the UE 112 to the final request particular service features either directly or indirectly. According to various embodiments, the UE 112 can provide to the portal, or can define via the portal, a service request. In one or more embodiments, the service request can include service feature data that represents service features desired or needed in a service being created and/or instantiated via the SDN controller 105. Alternatively, the service request can be a bare request for access to a service. In this case, the SDN controller 105 can determine the nature of the service and the functionality and resources required for providing the service.

In an embodiment, the UE 112 may include a 4G radio front end (RFE) 133 and a first baseband processing unit (BBU) 135. UE 112 may also be provided with a 5G RFE 137 and a second BBU 139. In the Universal Mobile Telecommunications System (UMTS) and 3GPP Long Term Evolution (LTE), UE 119 may be any device used directly by an end-user to communicate. UE 112 may be a hand-held telephone, a laptop computer equipped with a mobile broadband adapter, or any other device. UE 112 connects to the base station Node B/eNodeB (not shown) in RAN 103 as specified in the ETSI 125/136-series and 3GPP 25/36-series of specifications. RFE 133 and RFE 137 generally include everything between the antenna and the digital baseband system, typically all the filters, low-noise amplifiers (LNAs), and down-conversion mixer(s) needed to process the modulated signals received at the antenna into signals suitable for input into the baseband analog-to-digital converter (ADC). For this reason, RFE 133 and RFE 137 are considered the analog-to-digital or RF-to-baseband portion of a receiver. BBU 133 and BBU 139 are responsible for processing the baseband signals.

Figure 2:
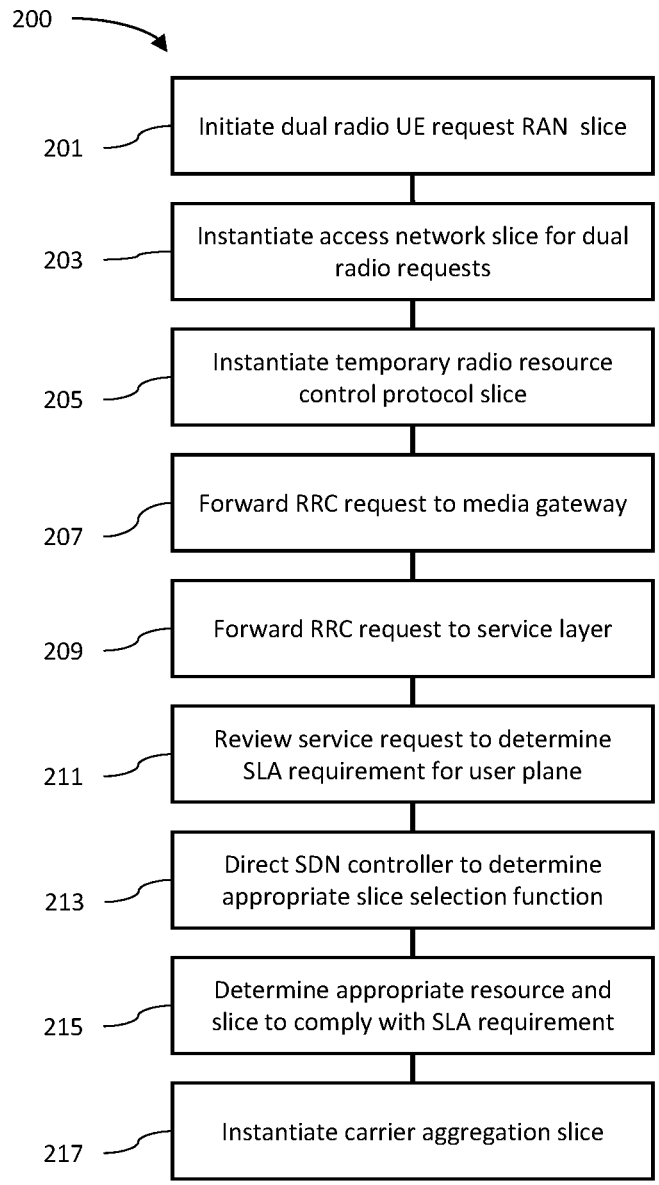
FIG. 2 is a flowchart of a method for 5G device initiated dynamic access networks slice switching.

Illustrated in FIG. 2 is a flowchart of a method 200 for 5G on demand intelligent analytics dynamic access network slice switching and carrier aggregation.

In step 201 the method initiates a dual radio UE (e.g. UE 111) request to a radio RAN slice. The RAN (e.g. RAN 127 in FIG. 1) resides between the UE and the core network (not shown) and provides a connection to the core network. The dual radio UE 119 may comprise a 4G RFE 121 and a 5G RFE 125.

In step 203 a UE initiates a service request (a 4G radio resource control (RRC) request and a 5G RRC request) to a RAN slice. In the case of 5G, a single physical network will be sliced into multiple virtual networks that can support different RANs, or different service types running across a single RAN. In an embodiment the network slicing may be implemented in the RAN. The RRC protocol is used on the air interface and it is a layer that exist between the UE and the eNode B and exists at the IP level. The major functions of the RRC protocol include connection establishment and release functions, broadcast of system information, radio bearer establishment, reconfiguration and release, RRC connection mobility procedures, paging notification and release and outer loop power control. By means of the signaling functions the RRC configures the user and control planes according to the network status and allows for Radio Resource Management strategies to be implemented.

In step 205 a RAN slice scheduler instantiates a temporary RRC slice with an associated timer that allows the dual radio UE to stay connected to the radio access network for a period of time. The temporary RRC slice serves to "hold" and "keep alive" the UE's service request. The operation of the RRC is guided by a state machine which defines certain specific states that a UE may be present in. The different states in this state machine have different amounts of radio resources associated with them and these are the resources that the UE may use when it is present in a given specific state. Since different amounts of resources are available at different states the quality of the service that the user experiences and the energy consumption of the UE are influenced by this state machine.

In step 207 the RAN slice forwards the combined 4G RRC and 5G RRC requests to a management gateway via the control plane.

In step 209 the management gateway forwards the RRC request to a service layer. The service layer is the middle layer between presentation and data store. It abstracts business logic and data access. In intelligent networks and cellular networks, a service layer is a conceptual layer within a network service provider architecture. It aims at providing middleware that serves third-party value-added services and applications at a higher application layer. The service layer may provide capability servers owned by a telecommunication network service provider, accessed through open and secure Application Programming Interfaces (APIs) by application layer servers. The service layer also provides an interface to the core networks at a lower resource layer, for example the control layer and transport layer. The idea behind such a layer is to have an architecture which can support multiple presentation layers such as web, mobile, etc.

In step 211 the service layer reviews the service request and determines the service level agreement (SLA) requirements for a user plane which carries the network user traffic. Typical SLA requirements may include quality of service class identifier (QCI) which is a requirement to ensure proper quality of service for better traffic in the LTE networks; address resolution protocol (ARP) requirements; UE aggregate maximum bit rate (AMBR); and access point name (APN) AMBR, among others.

In step 213 the service layer directs an SDN controller (e.g. SDN controller 105 in FIG. 1) to determine the appropriate SSF to be applied to the request for service. An SSF may include a network interface for receiving indications of triggering events and for transmitting instructions, and a processor and non-transient memory for storing the instructions. The instructions, when executed by the processor, cause the slice selection function to, upon receiving an indication that a slice reselection triggering event associated with a UE attached to a first slice has occurred, select a second slice as a target slice; and to initiate a migration of the UE to the selected target slice. The SSF handles the UE's initial attach request and new session establishment request by selecting an appropriate slice for the request for service.

In step 215 the SSF determines the appropriate resource and appropriate slice for complying with the user plane SLA requirement.

In step 217 the SSF further engages the RAN slice to instantiate a carrier aggregation slice whereby both the 4G RRC and 5G RRC comply with the user plane SLA requirements. Carrier aggregation is an LTE-Advanced feature that bonds together bands of spectrum to create wide channels, produce greater capacity and deliver faster speeds on capable devices. Essentially the idea of carrier aggregation is to take slices of radio spectrum from the different radio bands the carrier owns in a particular market and bunch them together to make a bigger channel. Carrier aggregation may be used to increase the bandwidth, and thereby increase the bitrate.

Figure 3:
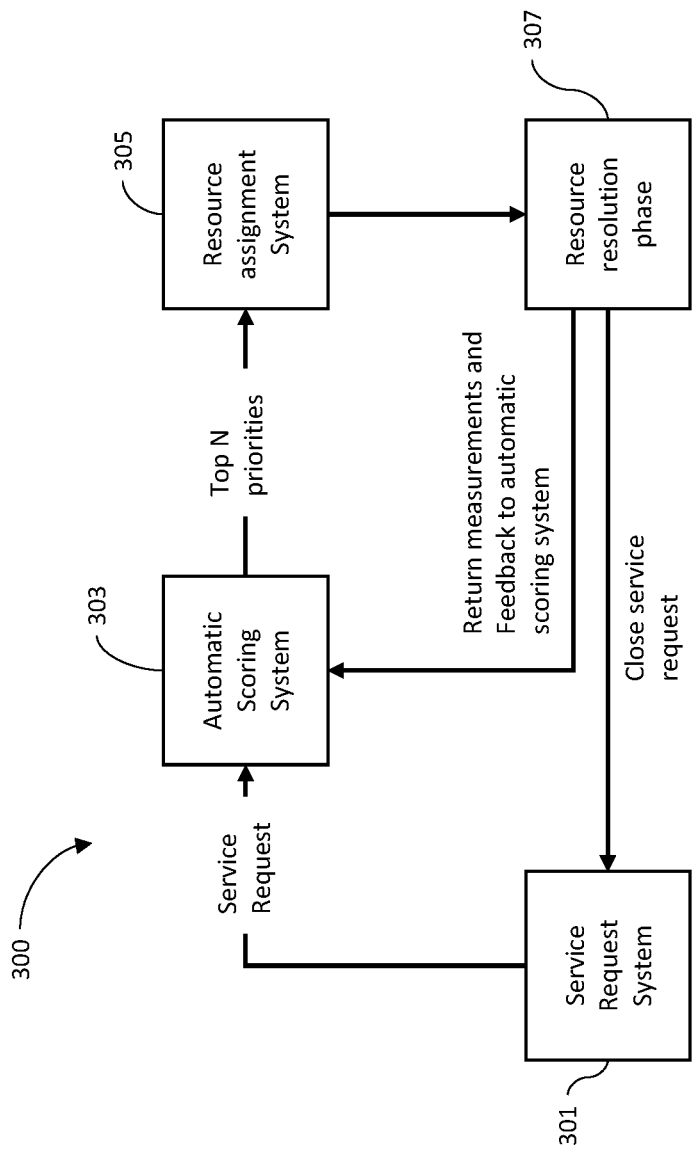
FIG. 3 is an illustration of a system for dynamic resource allocation in a network.

Illustrated in FIG. 3 is a schematic of a decision system 300 that can dynamically select the top N issues, on demand, and assign resources in order to provide service assurance for the most critically needed and most preferred services. In operation, a service request is initiated by a service request system 301 and is directed to an automatic scoring system 303. The automatic scoring system 303 records each case and measures data for each case. It then assigns one of the top N priorities at the resource assignment system 305. The selected resource assignment is provided to a resource resolution phase 307 that closes the service request with service request system 301 and returns measurements and feedback to the automatic scoring system 303 to train the weight parameters in the automatic scoring system 303. The decision system 300 may allocate services based on the most critically needed and most preferred basis, for example:

Most-Preferred customers

Most-Critically Needed customers (senior citizen,

Most-Critically Needed Service Area (earthquake, tsunami, tornado, hurricane)

Most-Critically Needed Event Coverage (Super Bowl, Olympics, World Cup,)

Highest Priority devices (e.g., iPhone 6)

Highest Priority Services (VoLTE launch, etc)

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the disclosure are part of the scope of this disclosure. Accordingly, the appended claims and their legal equivalents should only define the disclosure, rather than any specific examples given.

What is claimed:

1. A method comprising:
   receiving at a radio access network a 4G service request and a 5G service request from a dual radio user equipment having a specified priority;
   instantiating a first radio access network slice for the 4G service request and the 5G service request using a radio access network scheduler;
   instantiating, using the radio access network scheduler, a temporary radio resource control protocol slice having an associated timer related to the specified priority that allows the dual radio user equipment to stay connected to the radio access network for a period of time;
   forwarding a combined 4G and 5G radio resource control protocol request to a management gateway via a control plane;
   receiving instructions identifying an appropriate resource and an appropriate radio access network slice to comply with user plane service level agreement requirements;
   engaging a second radio access network slice; and
   instantiating a carrier aggregation slice comprising the combined 4G and 5G radio resource control protocol request to increase bandwidth to comply with the user plane service level agreement requirement.

2. The method of claim 1 wherein the combined 4G and 5G radio resource control protocol provides connection establishment and release functions, broadcast of system information, radio bearer establishment, reconfiguration and release, RRC connection mobility procedures, paging notification and release and outer loop power control.

3. The method of claim 1 wherein the period of time is determined by use of decision logic based on the specified priority.

4. The method of claim 1 wherein the instructions are determined by a slice selection function.

5. The method of claim 4 wherein the slice selection function is determined by a software defined network controller.

6. The method of claim 1 wherein the user plane service level agreement requirements comprise one or more selected from among a group comprising a quality of service class identifier, an address resolution protocol, a user equipment aggregate maximum bit rate, and an access point name aggregate maximum bit rate.

7. The method of claim 1 wherein the user plane service level agreement requirements are determined at a service layer.

8. A system comprising:
a processor;
a memory coupled to the processor and configured to store program instructions executable by the processor to:
receive at a radio access network a 4G service request and a 5G service request from a dual radio user equipment having a specified priority;
instantiate a first radio access network slice for the 4G service request and the 5G service request using a radio access network scheduler;
instantiate using the radio access network scheduler, a temporary radio resource control protocol slice having an associated timer related to the specified priority that allows the dual radio user equipment to stay connected to the radio access network for a period of time;
forward, through the temporary radio resource control protocol slice, a combined 4G and 5G radio resource control protocol request to a management gateway via a control plane;
receive resource instructions identifying an appropriate resource and an appropriate radio access network slice for complying with user plane service level agreement requirements;
engage a second radio access network slice; and
instantiate a carrier aggregation slice comprising both the 4 G and 5G radio resource control protocol request to increase bandwidth to comply with a user plane service level agreement requirement.

9. The system of claim 8 wherein combined 4G and 5G radio resource control protocol provides connection establishment and release functions, broadcast of system information, radio bearer establishment, reconfiguration and release, RRC connection mobility procedures, paging notification and release and outer loop power control.

10. The system of claim 8 wherein the period of time is determined by use of decision logic based on the specified priority.

11. The system of claim 8 wherein the resource instructions are determined by a slice selection function.

12. The system of claim 11 wherein the slice selection function is determined by a software defined network controller.

13. The system of claim 8 wherein the user plane service level agreement requirements comprise one or more selected from among a group comprising a quality of service class identifier, an address resolution protocol, a user equipment aggregate maximum bit rate, and an access point name aggregate maximum bit rate.

14. The system of claim 8 wherein the user plane service level agreement requirements are determined at a service layer.

15. A non-transitory computer-readable storage medium, comprising program instructions, wherein the program instructions are computer-executable to:
receive at a radio access network a 4G service request and a 5G service request from a dual radio user equipment having a specified priority;
instantiate a first radio access network slice for the 4G service request and the 5G service request using a radio access network scheduler;
instantiate, using the radio access network scheduler, a temporary radio resource control protocol slice having an associated timer related to the specified priority that allows the dual radio user equipment to stay connected to the radio access network for a period of time;
forward a combined 4G and 5G radio resource control protocol request to a management gateway via a control plane;
receive resource instructions identifying an appropriate resource and an appropriate radio access network slice for complying with user plane service level agreement requirements;
engage a second radio access network slice; and
instantiate a carrier aggregation slice comprising both the 4 G and 5G radio resource control protocol request to increase bandwidth to comply with a user plane service level agreement requirement.

16. The non-transitory computer-readable storage medium of claim 15 wherein the combined 4G and 5G radio resource control protocol provides connection establishment and release functions, broadcast of system information, radio bearer establishment, reconfiguration and release, RRC connection mobility procedures, paging notification and release and outer loop power control.

17. The non-transitory computer-readable storage medium of claim 15 wherein the period of time is determined by use of decision logic based on the specified priority.

18. The non-transitory computer-readable storage medium of claim 15 wherein the resource instructions are determined by a slice selection function.

19. The non-transitory computer-readable storage medium of claim 18 wherein the slice selection function is determined by a software defined network controller.

20. The non-transitory computer-readable storage medium of claim 15 wherein the user plane service level agreement requirements comprise one or more selected from among a group comprising a quality of service class identifier, an address resolution protocol, a user equipment aggregate maximum bit rate, and an access point name aggregate maximum bit rate.

* * * * *